(12) United States Patent
Yuan et al.

(10) Patent No.: US 6,920,042 B2
(45) Date of Patent: Jul. 19, 2005

(54) COMPUTER ENCLOSURE INCORPORATING PERIPHERAL DEVICE MODULE

(75) Inventors: Ming-Huan Yuan, Tu-Chen (TW); Cheng Kuang Chung, Tu-Chen (TW); Leo Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 134 days.

(21) Appl. No.: 10/442,857

(22) Filed: May 20, 2003

(65) Prior Publication Data

US 2004/0100763 A1 May 27, 2004

(30) Foreign Application Priority Data

Nov. 22, 2002 (TW) ........................................ 91218815 U

(51) Int. Cl.⁷ ................................................. G06F 1/16
(52) U.S. Cl. ........................................ 361/685; 361/683
(58) Field of Search ........................ 361/679, 683–686; 312/223.1–223.3

(56) References Cited

U.S. PATENT DOCUMENTS 5,822,184 A    10/1998  Rabinovitz
6,075,694 A  *  6/2000  Mills et al. ................... 361/685
6,317,334 B1 * 11/2001  Abruzzini et al. ............ 361/797
6,542,362 B2 *  4/2003  Lajara et al. ................. 361/687

* cited by examiner

*Primary Examiner*—Yean-Hsi Chang
(74) *Attorney, Agent, or Firm*—Wei Te Chung

(57) ABSTRACT

A computer enclosure includes a cage (30) and a peripheral device module (40). The cage includes a main body (32), and a bezel (31) mounted at a front portion of the main body. The bezel defines an opening (33). The main body includes a pair of lateral support plates (34). Each support plate defines fastening units therein. The peripheral device module includes a housing (41), and carriers (42) received in the housing. The housing includes protrusions (48) on each of opposite sides thereof, with each protrusion defining a locking hole (481) therein. The protrusions of each side of the housing correspond to through holes (341) and slots (342) of a selected fastening unit of a corresponding support plate of the cage. Fasteners are extendable through the selected fastening units to engage with the protrusions, thereby securing the peripheral device module to the cage.

13 Claims, 4 Drawing Sheets

COMPUTER ENCLOSURE INCORPORATING PERIPHERAL DEVICE MODULE

BACKGROUND OF THE INVENTION

1. Field of the Invention

The present invention relates generally to computer enclosures, and more particularly to a computer enclosure incorporating a peripheral device module therein.

2. Related Art

Many computer systems, including personal computers, workstations, servers, and embedded systems are designed to have multiple peripheral devices included therein. Such peripheral devices include, for example, compact disk read-only memory (CD-ROM) drives, hard disk drives, and floppy disk drives. There have been numerous attempts at making such components of a computer easily replaceable and interchangeable. In particular, modular data storage device assemblies have been adapted to be mounted to computer enclosures.

U.S. Pat. No. 5,822,184 discloses a modular data storage assembly comprising a housing enclosure that is designed to fit into an expansion bay. The housing enclosure defines an internal open area and a front opening. A plurality of guide members mounted in the housing enclosure defines a plurality of hard disk drive bays in the open area. A plurality of individual plug-in data storage devices is adapted to be slid along the guide members into respective hard disk drive bays. The housing enclosure has exterior dimensions corresponding to interior dimensions of the expansion bay, such that the housing enclosure is operatively mountable in the expansion bay by inserting the housing enclosure therein as a self-contained unit. However, the structures of the components of the data storage assembly are unduly complicated. Furthermore, the mounting procedure is cumbersome and time consuming.

For the above reasons, an improved mounting apparatus for peripheral device modules is desired.

SUMMARY OF THE INVENTION

Accordingly, an object of the present invention is to provide a computer enclosure having a simple structure such that peripheral device modules can be easily installed thereinto and removed therefrom.

To achieve the above-mentioned object, a computer enclosure in accordance with a preferred embodiment of the present invention includes a cage and a peripheral device module. The cage includes a main body, and a bezel mounted at a front portion of the main body. The bezel defines an opening. The main body includes a pair of lateral support plates. Each support plate defines a plurality of fastening units therein. The peripheral device module includes a housing and a plurality of carriers received in the housing. The housing includes a plurality of protrusions on each of opposite sides thereof, with each protrusion defining a locking hole therein. The protrusions of each side of the housing correspond to through holes and slots of a selected fastening unit of a corresponding support plate of the cage. A plurality of fasteners (not labeled) is extendable through the selected fastening units to engage with the protrusions, thereby securing the peripheral device module to the cage.

Other objects, advantages and novel features of the present invention will be drawn from the following detailed description of the preferred embodiment of the present invention with the attached drawings, in which:

DESCRIPTION OF THE PREFERRED EMBODIMENT

Figure 1:
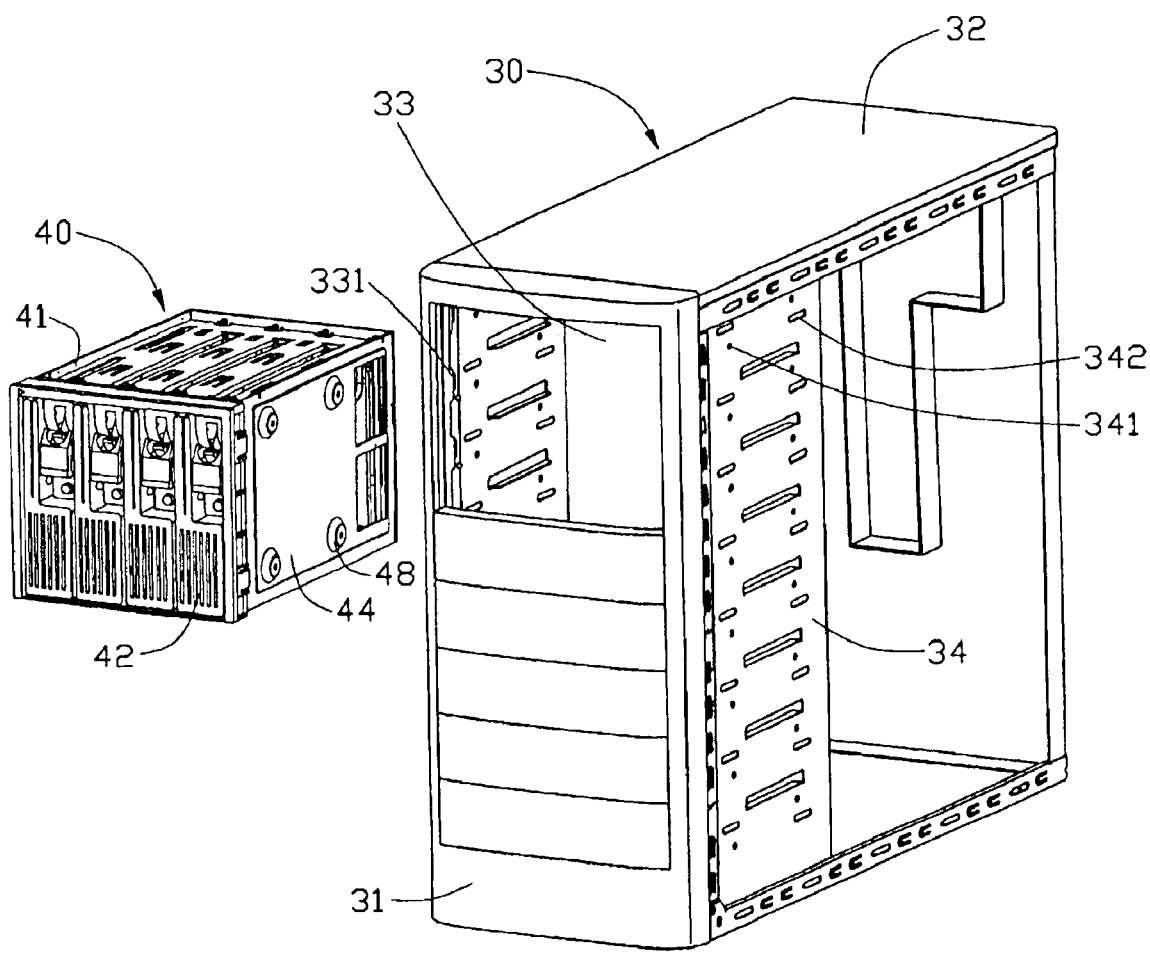
FIG. 1 is an exploded, isometric view of a computer enclosure and a peripheral device module, in accordance with the preferred embodiment of the present invention.
Figure 2:
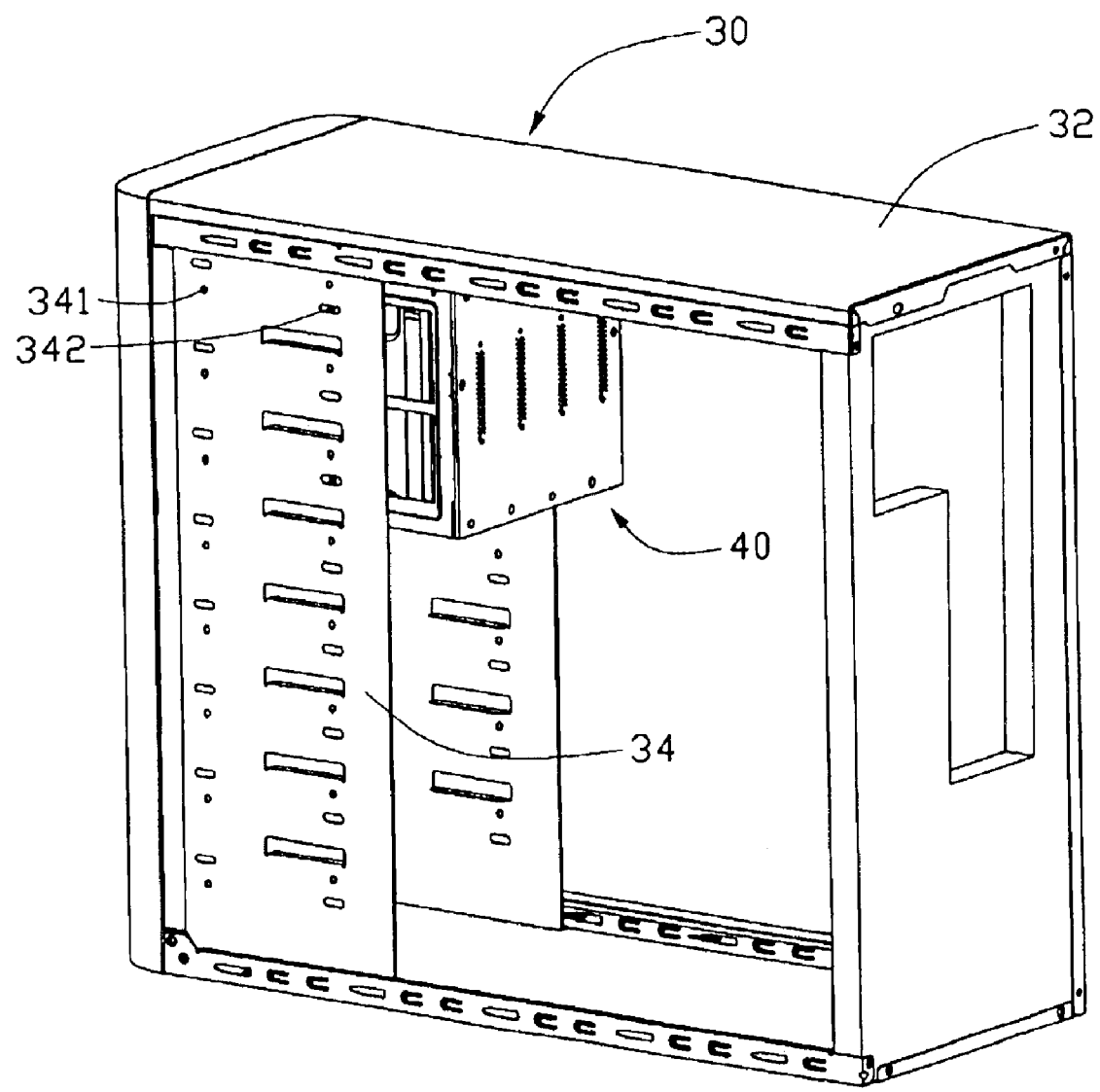
FIG. 2 is an assembled view of FIG. 1, but viewed from another aspect.

Referring to FIGS. 1–2, a computer enclosure incorporating a peripheral device module in accordance with the preferred embodiment of the present invention comprises a cage 30 and the peripheral device module 40.

The cage 30 comprises a main body 32, and a bezel 31 mounted at a front portion of the main body 32. The bezel 31 defines an opening 33 for receiving the peripheral device module 40 therethrough. A plurality of evenly-spaced first lock members 331 is provided at opposite lateral sides of a front portion of the main body 32, with certain of the first lock members 331 being disposed at opposite lateral sides of the opening 33. The main body 32 comprises a pair of parallel lateral support plates 34. The support plates 34 cooperatively define a space (not labeled) therebetween for slidingly and then engagingly receiving the peripheral device module 40 therein. A plurality of fastening units is defined in the support plates 34. Each fastening unit comprises a pair of through holes 341 positioned diagonally relative to each other, and a pair of slots 342 positioned diagonally relative to each other. In addition, each fastening unit has its through holes 341 and slots 342 arranged differently relative to the through holes 341 and slots 342 of an adjacent fastening unit. That is, fastening units having either of two kinds of arrangements of through holes 341 and slots 342 are arranged along a length of each support plate 34 in alternating fashion.

Figure 3:
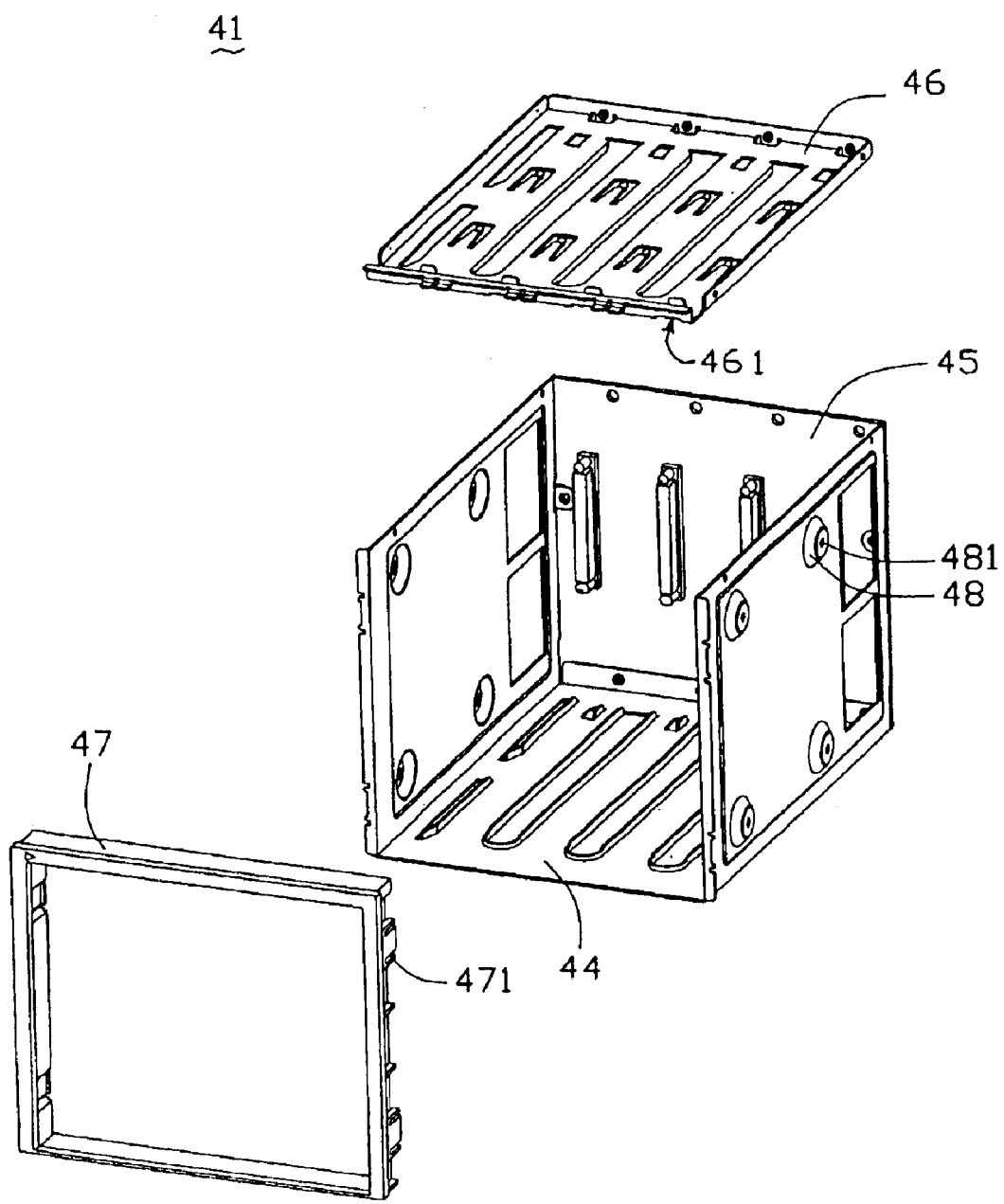
FIG. 3 is an exploded, isometric view of a housing of the peripheral device module of FIG. 1.
Figure 4:
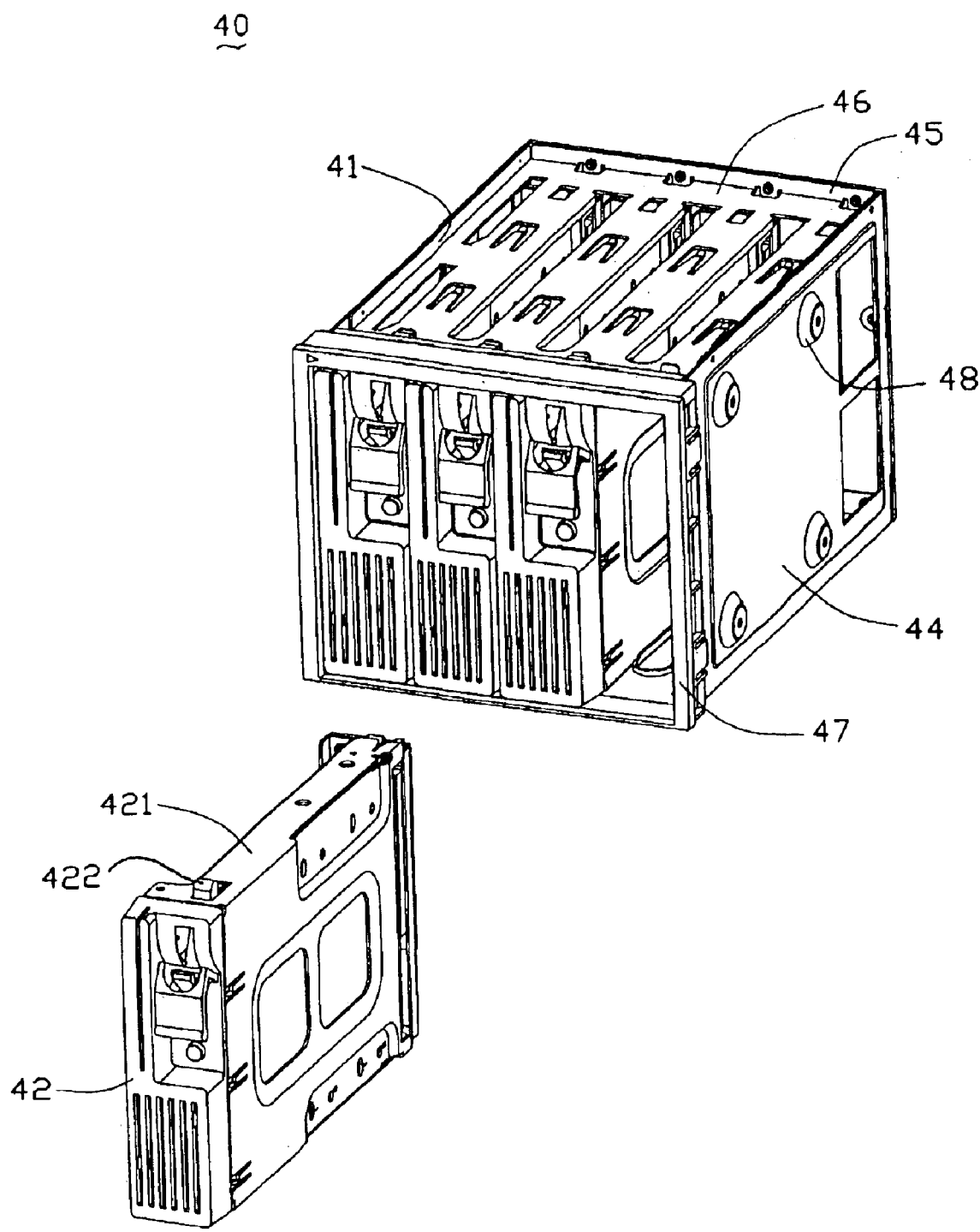
FIG. 4 is an enlarged, exploded view of the peripheral device module of FIG. 1.

Referring also to FIGS. 3–4, the peripheral device module 40 is adapted to be secured to the cage 30. The peripheral device module 40 has a generally parallelepiped-shaped construction, and comprises a housing 41 and a plurality of carriers 42 received in the housing 41. Each carrier 42 comprises a drive bracket 421 for accommodating a data storage device (not shown) therein. The housing 41 comprises a U-shaped plate 44, a rear plate 45, a top plate 46 and a front frame 47. The U-shaped plate 44, rear plate 45, top plate 46 and front frame 47 cooperatively define a space therebetween for receiving the carriers 42 therein. The front frame 47 defines a plurality of second lock members 471, for engaging with the first lock members 331 of the cage 30. A plurality of spaced protrusions 48 is stamped outwardly from opposite lateral sides (not labeled) of the U-shaped plate 44. Each protrusion 48 defines a locking hole 481 therein, corresponding to a respective through hole 341 or a respective slot 342 of the support plate 34 of the cage 30. Fasteners (not shown) are extendable through selected fastening units of the support plates 34 of the cage 30 to engage with the protrusions 48 thereby securing the peripheral device module 40 to the cage 30.

Referring to FIGS. 1–4, in assembly, the rear plate 45, top plate 46 and front frame 47 are respectively secured to a rear portion, a top portion and a front portion of the U-shaped plate 44 to form the housing 41. A plurality of carriers 42 is inserted into the housing 41 from the front frame 47 and retained therein by engagement between the locking projection 422 of the carrier 42 and the recess 461 of the top plate 46. Thus the peripheral device module 40 is assembled. The peripheral device module 40 is inserted into the cage 30 through the opening 33 of the bezel 31. The first lock members 331 of the cage 30 are engaged with the second lock members 471 of the periperal device module 40. Then the fasteners (not shown) are extended through selected fastening units of the cage 30 to engage in the locking holes 481 of the protrusions 48, thereby securing the peripheral device module 40 to the cage 30.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A computer enclosure comprising:
   a cage comprising a main body and a bezel mounted at a front portion of the main body, the bezel defining an opening therein, the main body comprising a pair of support plates generally at opposite sides of the bezel and parallel to each other, each of the support plates defining a plurality of fastening units; and
   a peripheral device module secured to the enclosure via the opening, the peripheral device module comprising a housing and a plurality of carriers received in the housing, the housing comprising a plurality of protrusions stamped therefrom toward the supporting plates corresponding to a selected pair of the fastening units;
   wherein a plurality of fasteners is extendable through the selected pair of the fastening units to engage with the protrusions thereby securing the peripheral device module to the cage.

2. The computer enclosure as claimed in claim 1, wherein each of the fastening units comprises a pair of through holes positioned diagonally relative to each other and a pair of slots positioned diagonally relative to each other.

3. The computer enclosure as claimed in claim 2, wherein each of fastening units has its through holes and slots arranged differently relative to the through holes and slots of an adjacent fastening unit such that fastening units having either of two kinds of arrangements of through holes and slots are arranged along a length of each of the support plates in alternating fashion.

4. The computer enclosure as claimed in claim 1, wherein the housing comprises a U-shaped plate, a rear plate, a top plate and a front frame, and the rear plate, top plate and front frame are respectively secured to a rear portion, a top portion and a front portion of the U-shaped plate.

5. The computer enclosure as claimed in claim 4, wherein the protrusions of the housing are stamped outwardly from opposite lateral sides of the U-shaped plate.

6. The computer enclosure as claimed in claim 4, wherein a plurality of first lock members is arranged at opposite lateral sides of the front portion of the main body of the cage, certain of the first lock members being disposed at opposite lateral sides of the opening of the bezel.

7. The computer enclosure as claimed in claim 6, wherein a plurality of second lock members is arranged at the front frame of the housing, corresponding to the first lock members at the opening of the bezel.

8. The computer enclosure as claimed in claim 1, wherein each of the carriers of the peripheral device module comprises a drive bracket accommodating a data storage device therein.

9. A computer enclosure comprising:
   a cage comprising a main body with a bezel attached thereon, a pair of supporting plates, said bezel defining an opening; a plurality pairs of fastening units defined in the support plates, each of the fastening units comprising a pair of through holes positioned diagonally relative to each other and a pair of slots positioned diagonally relative to each other;
   a peripheral device module rearwardly inserted into the cage from said opening; and
   said peripheral device module including a housing with a plurality of carriers received therein, a plurality of locking holes defined in the housing corresponding to the fastening units of the cage;
   wherein a plurality of fasteners is extendable through the selected pair of the fastening units to engage with the locking holes thereby securing tho peripheral device module to the cage.

10. The computer enclosure as claimed in claim 9, wherein each of fastening units has its through holes and slots arranged differently relative to the through holes and slots of an adjacent fastening unit such that fastening units having either of two kinds of arrangements of through holes and slots are arranged along a length of each of the support plates in alternating fashion.

11. The computer enclosure as claimed in claim 9, wherein the support plate parallel to each other.

12. The computer enclosure as claimed in claim 9, wherein the housing comprises a plurality of protrusions stamped therefrom toward the supporting plates, said locking holes defined in the protrusions.

13. A computer enclosure comprising:
   a cage comprising a main body and a bezel mourned at a front portion of the main body, the bezel defining an opening therein, the main body comprising a pair of support plates generally at opposite sides of the bezel, each of the support plates defining a plurality of fastening units; and
   a peripheral device module secured to the enclosure via the opening, the peripheral device module comprising a housing and a plurality of carriers received in the housing, the housing comprising a plurality of protrusions corresponding to a selected pair of the fastening units;
   wherein a plurality of fasteners is extendable through the selected pair of the fastening units to engage with the protrusions thereby securing the peripheral device module to the cage; wherein
   each of the fastening units comprises a pair of through holes positioned diagonally relative to each other and a pair of slots positioned diagonally relative to each other; wherein
   each of fastening units has its through holes and slots arranged differently relative to the through holes and slots of an adjacent fastening unit such that fastening units having either of two kinds of arrangements of through holes and slots are arranged along a length of each of the support plates in alternating fashion.

* * * * *